United States Patent
Granzow et al.

(10) Patent No.: US 8,014,782 B2
(45) Date of Patent: Sep. 6, 2011

(54) FAST SETUP OF PHYSICAL COMMUNICATION CHANNELS

(75) Inventors: Wolfgang Granzow, Heroldsberg (DE); Georg Frank, Nuremberg (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 382 days.

(21) Appl. No.: 10/556,211

(22) PCT Filed: May 11, 2004

(86) PCT No.: PCT/SE2004/000721
§ 371 (c)(1),
(2), (4) Date: Oct. 9, 2007

(87) PCT Pub. No.: WO2004/100598
PCT Pub. Date: Nov. 18, 2004

(65) Prior Publication Data
US 2008/0123585 A1    May 29, 2008

(30) Foreign Application Priority Data
May 12, 2003   (SE) ....................... 0301400

(51) Int. Cl.
*H04W 72/00* (2009.01)
(52) U.S. Cl. .................. 455/450; 455/561; 370/329
(58) Field of Classification Search ................ 370/329; 455/450, 561, 422.1
See application file for complete search history.

(56) References Cited

U.S. PATENT DOCUMENTS

| | | | | |
|---|---|---|---|---|
| 6,094,576 A * | 7/2000 | Hakkinen et al. | ........... | 455/422.1 |
| 6,778,835 B2 * | 8/2004 | You et al. | ....................... | 455/455 |
| 6,810,258 B1 * | 10/2004 | Vialen | ........................... | 455/450 |
| 6,865,165 B1 * | 3/2005 | Huttunen | ....................... | 370/329 |
| 6,898,429 B1 * | 5/2005 | Vialen et al. | ................ | 455/432.1 |
| 7,054,633 B2 * | 5/2006 | Seo et al. | ........................ | 455/439 |
| 7,212,809 B2 * | 5/2007 | Khawand | ................... | 455/414.1 |
| 7,236,787 B1 * | 6/2007 | Tamura et al. | ................. | 455/437 |
| 7,301,921 B2 * | 11/2007 | Heo | ................................. | 370/329 |
| 7,301,988 B2 * | 11/2007 | Kanterakis | ..................... | 375/141 |
| 7,333,825 B2 * | 2/2008 | Hamiti et al. | .................. | 455/515 |
| 7,333,906 B2 * | 2/2008 | Reeve et al. | ..................... | 702/81 |

(Continued)

FOREIGN PATENT DOCUMENTS
WO    WO 0230134 A2    4/2002

OTHER PUBLICATIONS

Swedish Patent Office, International Search Report for PCT/SE2004/000721, dated Aug. 13, 2004.

*Primary Examiner* — Lester Kincaid
*Assistant Examiner* — Steven Kelley
(74) *Attorney, Agent, or Firm* — Roger S. Burleigh

(57) ABSTRACT

The present invention relates to improvements for a fast setup of physical communication channels in a CDMA-based communication system. A Node B of a telecommunication network is permitted to manage and assign a certain share of the downlink transmission resources of a radio network controller without inquiry of said radio network controller. On reception of a resource request message from a user equipment, the node B derives and specifies a certain amount of said resources that can be allocated to the user equipment. In a preferred embodiment of the present invention said resources are only assigned temporarily until the ordinary RL setup procedure, which involves the RNC, has been successfully finished.

7 Claims, 2 Drawing Sheets

U.S. PATENT DOCUMENTS

| | | | |
|---|---|---|---|
| 7,359,427 B2* | 4/2008 | Kanterakis et al. | 375/141 |
| 7,433,337 B2* | 10/2008 | Chao et al. | 370/331 |
| 2002/0041578 A1* | 4/2002 | Kim et al. | 370/335 |
| 2002/0049062 A1* | 4/2002 | Petersen | 455/453 |
| 2002/0119784 A1 | 8/2002 | Agin | |
| 2003/0031119 A1* | 2/2003 | Kim et al. | 370/200 |
| 2003/0076812 A1* | 4/2003 | Benedittis | 370/350 |
| 2004/0264497 A1* | 12/2004 | Wang et al. | 370/465 |
| 2005/0232158 A1* | 10/2005 | Hondo | 370/241 |
| 2007/0274278 A1* | 11/2007 | Choi et al. | 370/342 |

* cited by examiner

FAST SETUP OF PHYSICAL COMMUNICATION CHANNELS

FIELD OF THE INVENTION

The present invention relates to a fast setup of physical communication channels, e.g., in a CDMA-based radio communication system.

BACKGROUND OF THE INVENTION

In a Universal Mobile Telecommunications System (UMTS), by means of an example including a universal terrestrial radio access for a frequency division duplex (UTRA-FDD) system, the setup of dedicated channels is implemented as illustrated in FIG. 1: A mobile user equipment (UE) sends periodically short access preambles at an increasing power level on an uplink Physical Random Access Channel (PRACH), step 11. When the user equipment receives an acquisition acknowledgement on the downlink Acquisition Indicator Channel (AICH), step 12, it sends the actual PRACH message, step 13. This message is in the following referred to as a "Resource Request", since it is assumed that the network, in reaction to this message, allocates dedicated resources for communication between the considered user and the network. The Resource Request is forwarded on a Common Channel (CCH) over the Iub-interface from the Node B to the RNC, step 14, where a decision is taken whether or not the requested resources are granted. In case of a positive decision, the RNC selects the parameters of the dedicated resources and initiates the RL Setup procedure of the NBAP protocol, step 15. Upon reception of an RL setup response from the Node B, step 16, the RNC sends a Physical Channel Reconfiguration (or Radio Bearer Setup, or Transport Channel Reconfiguration) message on a downlink common channel, i.e. a FACH that is mapped onto a SCCPCH, to the user equipment, step 17. When this Setup or Reconfiguration message has arrived and has been processed by the user equipment, the downlink DPCCH synchronization procedure is started by the user equipment and subsequently the uplink DPCCH transmit power control (TPC) preamble is transmitted which enables the Node B to obtain synchronization on the uplink DPCCH, step 18. After expiry of the time interval employed for uplink DPCCH TPC preamble transmission, the user equipment transmits a Setup or Reconfiguration Complete message on the now established uplink DCH, step 19. The arrival of the Setup or Reconfiguration Complete message in the RNC confirms that the dedicated connection has been established successfully. The network may wait until reception of this Complete message before user data is sent in the downlink direction. The established dedicated channel can now be used for data transmission in both uplink and downlink direction, step 20.

For efficient support of packet data services, frequent switching between data transmissions on common channels, i.e. RACH/FACH, and dedicated channels, i.e. DCH on both uplink and downlink, is needed. The involved concept is referred to as channel type switching. Channel type switching consists of two different procedures: switching from common to dedicated channels (DCH setup) or switching from dedicated to common channels (DCH release).

SUMMARY OF THE INVENTION

The main problem of existing technology according to the state of the art is the rather large latency involved with the transition from common to dedicated channel state, i.e. DCH setup time. The presently standardized scheme typically requires several hundreds of milliseconds to establish dedicated channels from common channel state Cell_FACH. It is therefore the objective of the present invention to reduce DCH setup times.

Generally, two different situations can be distinguished: In the one situation the mobile has not yet received any dedicated channel parameters and the network is not aware of a potential attempt by the mobile to establish a dedicated channel. In the other situation the mobile has assigned dedicated channel parameters and the network is aware that this mobile will attempt to setup a DCH within a given period of time.

The first situation occurs when the DCH setup is initiated by the mobile unit, e.g. due to large uplink traffic volume. The second situation occurs, for instance, when the DCH setup is initiated by the network, e.g. due to large downlink traffic volume. The second situation also occurs in case of periodic DCH setup (controlled by timers in the mobile equipment and the network). However, when the mobile unit is inactive for a rather large time, i.e. when it has been moved into a paging state, Cell_PCH or URA_PCH, in order to save power, it is advantageous when the mobile station reacts to paging by the network with an ordinary DCH setup procedure as in the first situation. The present invention addresses the first of the two situations described above.

The basic idea of the present invention is a fast DCH setup scheme that can be summarized as follows:

A Node B of a telecommunication network is permitted to manage and assign a certain share of the downlink transmission resources of a radio network controller without inquiry of said radio network controller. On reception of a resource request message from a user equipment, the node B derives and specifies a certain amount of said resources that can be allocated to the user equipment. In a preferred embodiment of the present invention said resources are only assigned temporarily until the ordinary RL setup procedure, which involves the RNC, has been successfully finished.

The main benefit of the scheme according to the present invention is the high speed of setting up dedicated channels, i.e. 20-30 ms. With the proposed method even short data packets, e.g. of around 100 ms duration, would be transmitted efficiently on dedicated channels, thus avoiding inefficient common channels for user data transmission.

DETAILED DESCRIPTION

Figure 2:
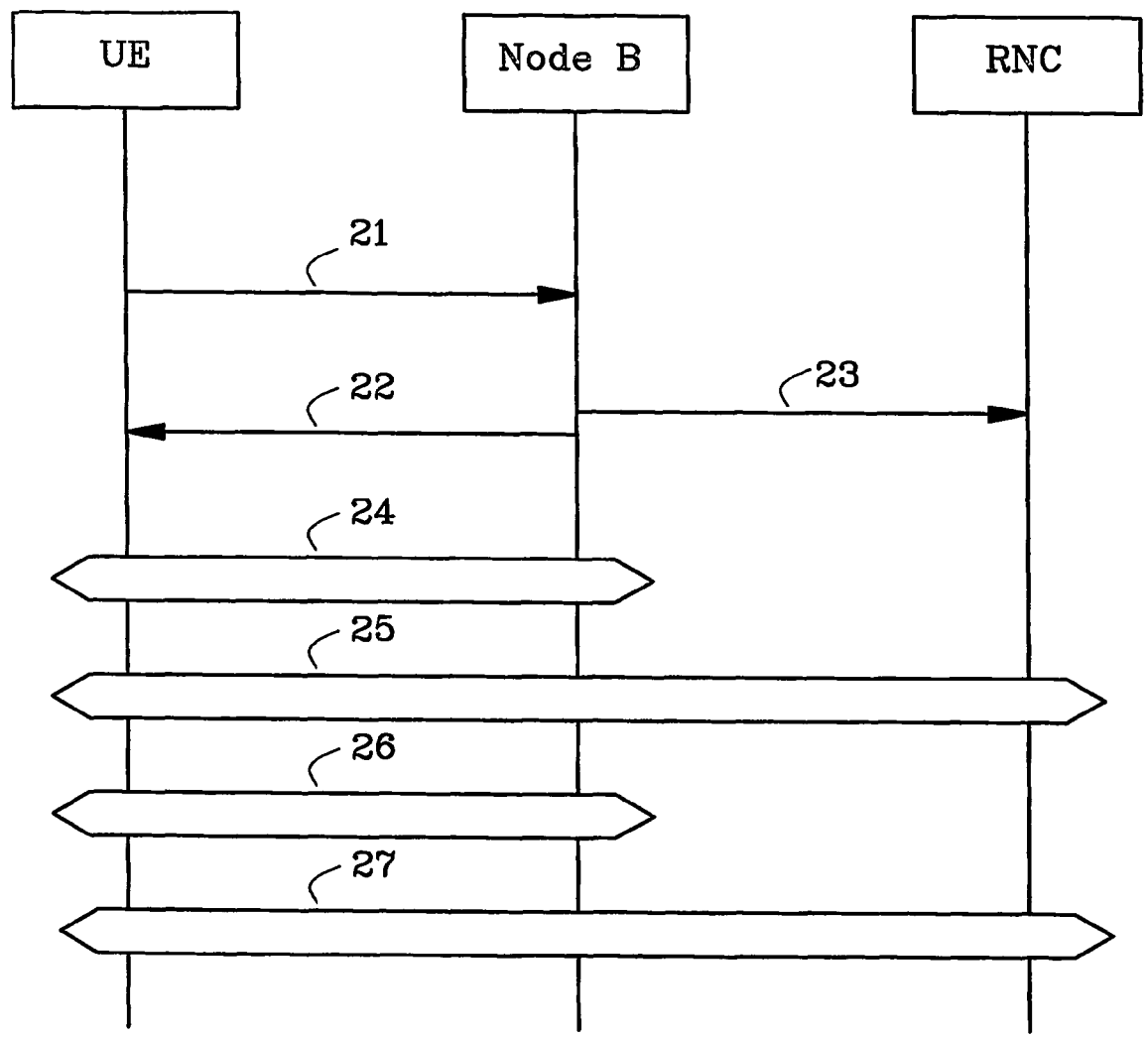
FIG. 2 describes the proposed fast DCH establishment according to the present invention.

FIG. 2 illustrates the signalling procedure of the proposed fast DCH setup scheme according to the present invention. As a prerequisite for the application of the proposed scheme, it is assumed that a context between the user equipment and the network has been created. This context is stored in both the user equipment and the Node B. As part of this context, a user identification (UE-ID) is assigned to the user equipment. Other information included in the context might be physical channel parameters needed when setting up the DPCH such as, e.g., spreading factor and slot format. It is further assumed that the context is created with separate procedures in a previous state.

The user equipment sends a short access preamble on an uplink Physical Random Access Channel (PRACH), step 21. In contrast to the preambles of an ordinary PRACH, the preambles of the proposed scheme include a UE-ID information. This UE-ID information enables the Node B to recognise, within the preamble acquisition phase, which particular user is accessing the system. This access preamble shall be interpreted as a "Resource Request" by the network. From the corresponding context, which is stored in the Node B, it is possible to derive a subset of resources, i.e. indicating both the amount and the expressively specified resources, that should be assigned to the requesting user equipment, e.g. based on knowledge of the Radio Bearer configuration of that particular user. The transmit power level of the access preamble shall be derived by means of the open-loop power control scheme as used for ordinary PRACH transmissions. The system should adjust SIR margins such that the likelihood for acquisition of the preamble by the Node B is rather high and such that a repetition of preamble transmission is not required normally. However, in case that the first transmitted preamble is not acknowledged, it shall be repeated by the terminal a short time interval later.

Upon acquisition of the access preamble, the Node B responds with a "Resource Assignment" message on the downlink, step 22. For this purpose a new downlink control channel can be introduced, which, within the context of the present invention, is referred to as High-Speed Shared Control Channel #2, HS-SCCH-2. This channel shall have a similar format as the HS-SCCH, which has been introduced for release-5 of UMTS for support of HS-DSCH transmissions, and comprise a short transmission time interval of only 2 ms.

The resource assignment shall include all parameters needed to establish a dedicated channel. According to one embodiment this includes especially the assignment of the downlink spreading code to be applied. Correspondingly, it would be possible to assign downlink time slots. It could also include information on the initial power level of the subsequently transmitted DPCH power control (TPC) preamble. The echoed UE-ID can be included implicitly as on the HS-SCCH. In contrast to the present DCH setup scheme according to the state of the art, where the RNC assigns resources, the present invention assumes that the Node B is capable to assign the DCH resources. For this purpose the Node B must be enabled to manage a part of the downlink code resources without inquiring the RNC. This can be done, for instance, by sharing code resources that are employed for HS-DSCH transmissions by the Node B. In case that the resources that have been assigned by the Node B shall only be assigned temporarily, the Node B will forward a resource request including at least the UE-ID to the responsible radio network controller, step 23. Another conceivable alternative could be to forward the resource request for information purposes to the radio network controller.

Upon reception of the Resource Assignment on control channel, the user equipment shall start transmitting the TPC preamble on the uplink DPCCH. In this step an appropriate synchronization procedure shall be applied such that uplink synchronization can be obtained within a short time interval, e.g. within 10 ms. After the power control preamble transmission phase is completed, both user equipment and Node B shall assume that the DCH connection is synchronized. Uplink and downlink transmission of user data can be started using the temporarily assigned resources, step 24.

If the established dedicated channel shall be used for more than just a few radio frames it is recommended to reconfigure the DPCH such that channelization codes are used which are managed by the RNC, step 25. This is to free those code resources which are autonomously managed by the Node B.

Furthermore it should be noted that it is not possible to support inter-Node B macro-diversity with codes that are assigned by Node B. Accordingly, in order to enable full support of macro-diversity, a reallocation of the channelization code will be necessary, too, step 26. The reallocation can be done "on the fly", i.e. without interruption of user data transmission. Also in this step it is likely that it is necessary to reconfigure the user plane transport bearer on the Iub/Iur-interfaces from a common transport bearer, which should be employed initially, to a dedicated transport bearer.

After reconfiguration of the (downlink) DPCH channelization codes and transport bearers, transmission is performed as usual in Cell_DCH state, step 27. The sequences shown in FIG. 2 show the case that a HS-DSCH is assigned to the UE. HS-DSCH transmission may already start in parallel with the "temporary" DPCH code assignment, i.e. before reconfiguration of the DPCH code.

The following sections now describe several further improvements to achieve enhancements of the DCH setup procedure for reducing the delay of DCH setup.

Figure 1:
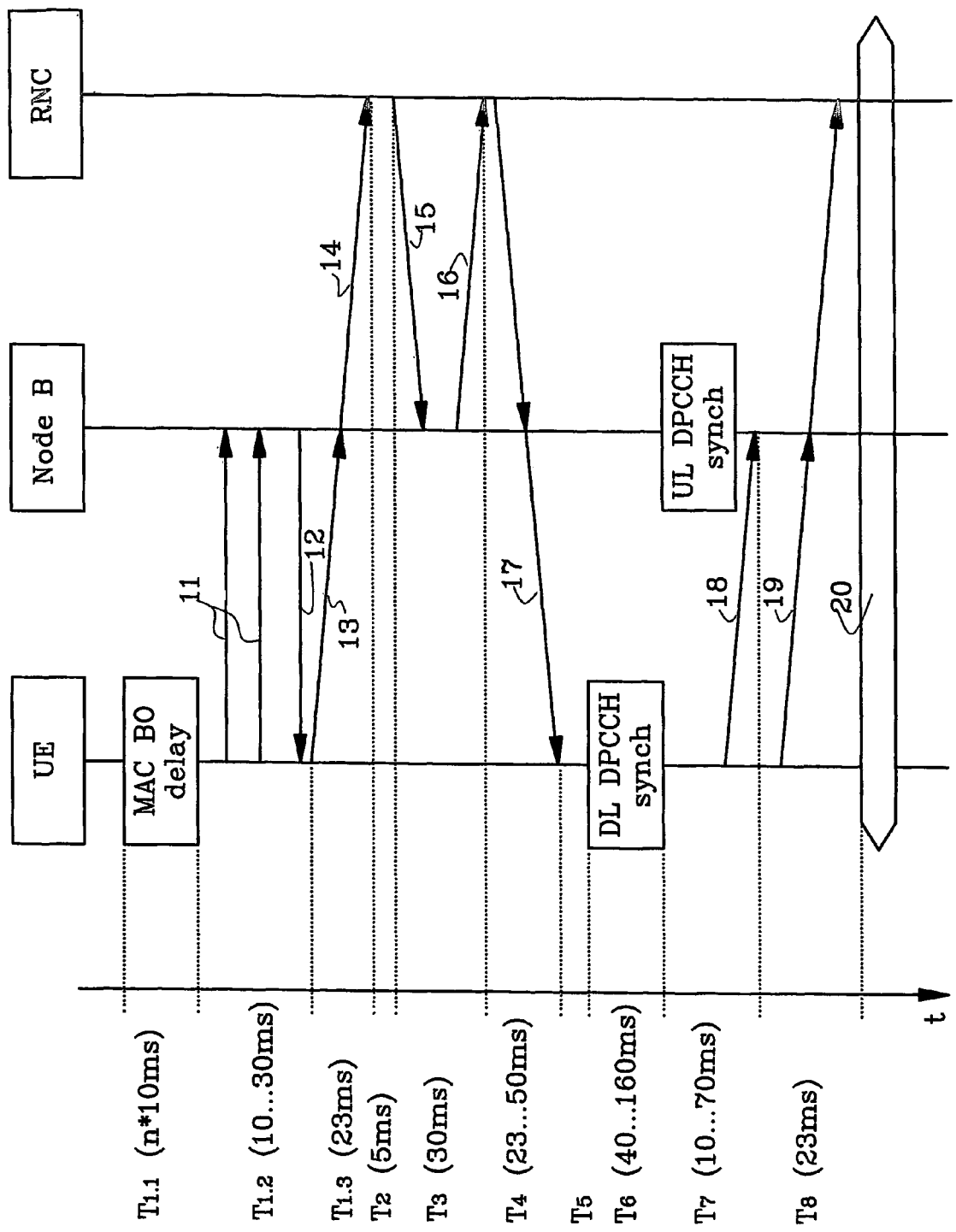
FIG. 1 describes a mobile initiated DCH establishment with existing technology in UTRA FDD mode by means of an example.

A first improvement refers to fast UL/DL synchronization. The intention of this scheme is a reduction of the time intervals $T_6$ and $T_7$ required for uplink and downlink synchronization as shown in FIG. 1. For the proposed synchronization scheme it is assumed that the user equipment obtains initial downlink synchronization on common channels (CPICH and/or P-CCPCH) such that no specific in-sync verification period on downlink DPCH is required. Uplink and downlink DPCH transmission shall start simultaneously (within the limits of the usual timing offsets) at an activation time indicated in the switching message. The time intervals $T_6$ and $T_7$ shall now fall together. The uplink DPCH is started sending power-ramped time-slots (power control preamble). The user equipment evaluates the downlink DPCH power control commands. As soon as the user equipment receives power down commands, this is interpreted as an acquisition indication of its uplink channel. Both user equipment and Node B then resume with ordinary power control on uplink and downlink DPCH. Performance evaluations have shown that this scheme can provide uplink-downlink synchronization within $T_6=T_7=10$ ms with very high reliability even in the presence of 10% error rate for the downlink power control commands.

The information whether or not this synchronization scheme is used must be exchanged in some way between UE and network, for instance, as additional UE capability parameter or by making it a mandatory feature for certain UMTS release.

The following will now discuss an improvement for reduction of the DCH setup time, which addresses other time intervals than DPCH synchronization time. These ideas can be combined with the fast synchronization scheme presented above. A straightforward way to reduce the time intervals $T_{1,1}$ and $T_{1,2}$ in FIG. 1 is allowing the UE to employ a specific PRACH to be used exclusively for DCH setup, or an ordinary PRACH with special parameters. This could be done as follows:

When providing special PRACH(s) in a cell to be used only for fast DCH setup such a channel could be assigned explicitly, e.g., at RRC connection setup. The assignment would be saved as part of the "communication contexts" in both the Node B and the user equipment. A separate PRACH scrambling code could be assigned to avoid collisions with "ordinary" PRACHs and a special set of access parameters could be assigned as will be discussed below.

The persistence value that governs the backoff delay could be set to a value P=1 such that $T_{1,1}=0$ at least for the first ramping cycle. Backoff delay may or may not be introduced when the first ramping cycle fails, i.e. none or negative acknowledgement on AICH received.

A special setting of initial preamble transmit power could be applied such that a high success rate for the first preamble transmission is achieved. This, however, results in a trade off between delay reduction and increased interference. The interference increase is more critical with respect to the message that follows the preamble, especially if the message would be transmitted at high data rate (small spreading factor). The possibility that the tx-power value of the preamble is set somewhat too high is, on the other hand, less critical.

By means of the embodiment described above the RACH access delay and the access delay variations could be reduced from presently several radio frames to its minimum of three access slots, i.e. $T_{min}=6*T_{slot}=4$ ms.

Still a further elaboration of the present invention relates to fast random access scheme with immediate UE identification and addresses potential delay reductions concerning the time intervals from $T_{1,3}$ to $T_5$ as shown in FIG. 1. This interval starts with sending a "Resource Request" and ends with the initiation of the synchronization procedure on the granted dedicated resources.

From FIG. 1 it is obvious that a significant amount of the time that is needed for setup is due to the fact that the resource request must be forwarded to the RNC where the decision is taken, the reconfiguration of the Node B(s) is controlled, and the resource assignment message is generated. Consequently, the following schemes consider a case where resource control responsibility is moved from the RNC into the Node B for DCH setup in RRC connected mode. This means that any necessary pre-agreements between the user equipment and the network, which may help to simplify the resource setup procedure, could be arranged in advance.

The minimum amount of information, which must be included into a resource request message, is a user equipment identifier (UE-ID). In addition, some information on the resource request "cause" may be included, which may help the receiver to select a suitable amount of resources to be assigned. However, in the following it is assumes that dedicated resources shall be assigned for which all relevant parameters, except for the downlink channelization code, have been pre-agreed and stored in the communication context. In this case reception of an RACH message, which simply consists of a UE-ID, would be sufficient to trigger the further resource assignment procedure.

Assuming that the Node B handles resource requests received from the user equipment and assigns resources, the following modification of the present random access scheme can be considered: The present connection setup can be seen as a "five-way handshake": preamble (UE)–Acquisition Indicator (Node B)–resource request message (UE)–resource assignment (RNC)–assignment confirm (UE). This can be simplified into an ordinary "3-way handshake": preamble=resource request (UE)–resource assignment (Node B)–assignment confirm (UE).

The physical implications resulting from the inclusion of the UE-ID information into the PRACH preamble will be discussed later in more detail. It should be noted here that this has a very important impact on the access principle, namely it makes the RACH collision-free. If the UE-ID is extracted by the Node B, it can be directly included into the resource assignment message replied to the user equipment. The resource assignment message replaces the acquisition indication. Of course since the amount of information increases, it cannot be transmitted on the present AICH. The resource assignment must include a DL DPCH channelization code and the echoed UE-ID. In addition for instance the initial UL DPCH power level could be included to make the DPCH synchronization procedure more efficient. An important requirement of the approach is that the Node B can autonomously assign channelization codes without inquiry of the RNC. However, this could be handled according to the principles of "shared channels". A shared physical channel, i.e. PDSCH and HS-PDSCH, can be interpreted as a part of the downlink code resource, which is controlled autonomously by the Node B. The DL DPCH channelization code could be taken initially from this shared resource as a temporary assignment. If necessary, for instance if the connection shall be maintained for a time interval longer than some given limit, the DL channelization code could be reconfigured with ordinary RRC and NBAP procedures using an assignment selected by the RNC.

The basic principle of the proposed scheme is illustrated by help of FIG. 2. It is assumed that the resource assignment is provided over a control channel, e.g. a high-speed shared control channel (HS-SCCH-2), step 22. Upon reception of said resource assignment, the user equipment could start a DCH setup procedure. The radio frame following the 10 ms-synchronization phase could then include the resource setup confirm message, which would complete the three-way handshake in the successful case. It would be desired that this confirm message is evaluated directly in the Node B without passing through RNC. In the setup failure case, when the confirm message is not received, this should trigger the release of the temporary allocated resources in the Node B. The confirm message could be forwarded to the RNC and used as a trigger to initiate a reconfiguration of the radio link, i.e. a change from the temporary to a permanent RNC assigned code. This approach is indicated in the example signaling sequence in FIG. 2. The time for sending the resource request (preamble), step 21, until start of the synchronization procedure seems feasible within 10 ms. In combination with the fast DCH setup scheme, the total DCH setup time amounts to just 20 ms.

The present PRACH includes a 4-bit information, which is referred to as signature. This information is presently not used as explicit UE-ID but instead to enable multiple simultaneous access attempts at low collision probability when the overall PRACH load is not too high. It would be straightforward to redefine the signature as an explicit UE-ID by mandating that a specific UE must use a specific preamble signature. In this case only a group of 16 users could be distinguished on one common PRACH scrambling code. The number of available PRACH UE-IDs, i.e. the UE-ID included into the PRACH preamble, limits the number of users that can take advantage of the proposed fast DCH setup procedure. It should be sufficiently large to handle those users that typically run a packet data service, e.g. web a browsing session, with frequent reason to switch between activity states, e.g. due to periods of inactivity for power saving reasons and to free downlink DPCH code resources. A number of 256 or 1024 should be sufficient, i.e. 8 or 10 bits code space. If the support of 10 bits would be technically feasible, the already defined "H-RNTI" could be employed simply on the preambles. The assignment of UE-ID can be handled the same way as for H-RNTI. A mapping between PRACH UE-ID and the 16-bit C-RNTI employed in MAC c/hs needs to be defined.

The Resource Assignment message sent on HS-SCCH-2 preferably includes the following information elements:
PRACH UE-ID (8 or 10 bits);
DL DPCH channelization code (8 bits);
Initial power offset for UL DPCH (4 or 5 bits);
CRC code (16 bits);

Protocol information, e.g. explicit resource assignment reject, etc. (1-3 bits).

It is assumed that a user-specific timing offset of the DPCH relative to CPICH can also be pre-configured. If this is not feasible this information would need to be included into the Resource Assignment message in addition. The size of the Resource Assignment message amounts to around 40 bits. A channel similar to HS-SCCH would be well suitable to carry the Resource Assignment messages. However, it should be noted that a single HS-SCCH-2 can carry only a Resource Assignment message for a single UE per subframe. Therefore several parallel HS-SCCH-2 channels might be needed to serve multiple resource request simultaneously.

The following section gives attention to the case where the request for DCH setup originates at the network side. It considers the case where the UE initially is in paging channel state. The present procedure has been described in FIG. 4. In this case, the decision to set up dedicated channels is taken at the network side. In the next step the network sends a page indicator to the respective UE, which essentially triggers the UE-side part of the DCH setup procedure. The paging procedure can be simplified, by allowing the UE to tune directly to a channel where the resource assignment is provided. This could be, e.g., the HS-SCCH-2 channel discussed above. Note that an improvement would also be achieved if the resource allocation were sent on FACH/S-CCPCH since at least the intermediate step of reading PCH is saved.

Regarding the preamble design, according to present specifications a PRACH preamble consists of 4096 chips, which is a sequence of 256 repetitions of Walsh-Hadamard codes of length 16. The preamble is scrambled with a PRACH specific scrambling code. The Walsh-Hadamard codes are referred to as signature of the preamble. The present preamble structure has been designed with main focus on providing a low false alarm rate and high detection probability under fast fading and frequency offset conditions. However the hardware complexity is slightly increased compared with other useful preamble schemes (for fading at moderate velocities). In a possible implementation for discriminating one set of PRACH preambles the preamble receiver comprises of a code matched filter for descrambling (buffer for 256 chips); a fast WH transform of length 16; 16 integrate and dump blocks covering a time window equal to of the expected delay spread.

There are further options when including UE-ID information into the preamble that can be considered:

Multiple scrambling codes: The presently defined PRACH has capability to distinguish between 16 different UE-IDs. The most straightforward way to increase the number of UE-IDs would be to configure several parallel PRACH channels, each one employing a different scrambling code. However, with this approach receiver complexity increases proportional with the number of signatures. The ratio of hardware increase relative to the increased number of UE-IDs is extremely unfavourable, because nevertheless only a few UE-IDs will be used at a given time, whereas receiver hardware is provided which is capable to detect all UE-IDs simultaneously.

Increased set of signatures: A second method for increasing the number of usable UE-IDs is to increase the set of signatures, e.g. from presently 16 to N=256 (or 1024). In this case each preamble is composed of 16 symbols, each spread with a Walsh-Hadamard symbol of length 256. This requires N×N WHT, one integrate and dump block for each of the N signatures. Only a single scrambling code used and only a single code matched filter is required. The resulting Hardware complexity is almost the same as for the scheme described above.

Mixed concept with modulation: A compromise between hardware demand and flexibility is a combination of the present Walsh-Hadamard signature with an additional modulation on the preamble. This scheme comprises a first level signature as in the original scheme with Walsh-Hadamard spreading of length $N_1$=16 or higher. This parameter limits the number of accesses, which could be handled simultaneously. A sequence of several successive Walsh-Hadamard symbols could then represent a modulation interval and would be modulated with a symbol of a second level signature. Both signatures together define the number $2^{(N_1+N_2)}$ of UE-IDs. The second level 'signature' could be a symbol out of a set of orthogonal symbols, or a conventionally coded binary (or quaternary) number and could even include CRC protection. This mixed concept allows handling a large set of UE-IDs. The receiver could be simplified by increasing the access slot size and dividing the preamble into two parts, where the first part carries the ordinary signature and only the second part is modulated. This scheme allows using an ordinary preamble receiver in a first detection step, where the signature and the channel propagation paths should be detected. In a second detection step the UE-ID would be demodulated from the second part of the preamble, employing the channel paths determined in the first step. The additional information about the increased set of UE-IDs is encoded in the second part, which can be de-spreaded by the same hardware as the first preamble part. Only the integrate and dump operation has to be performed in separate hardware including the necessary demodulation, e.g. by re-modulation, on the already known propagation paths.

Time division: The number of independent UE-IDs can also be increased by assignment of different access slots to different users. This results in a quite simple preamble receiver structure. However, this implies also a somewhat increased delay. In order to reduce the delay increase, the present access slots could also be divided into a number of sub-access-slots. The length of a sub-access-slot must be larger than the searcher window of the receiver, i.e. larger than twice the propagation delay.

Techniques to improve preamble detection performance: When designing the preamble receiver advanced techniques such as interference-suppressing multi-user detectors should be considered to improve the overall detection performance. When time-division for the preambles as described above is employed, the CTDMA approach could be considered, where inverse filters instead of code matched filters are employed for ease of receiver complexity. It should be noted that a very low false alarm rate is an important requirement of the proposed scheme. False alarms will cause unnecessary resource reservations in the Node B and transmissions of resource assignments on the downlink. A false alarm would be detected only by the Node B when no confirm message is received within the defined waiting time. The introduction of a CRC on the UE-ID would be a means for adjustment of false alarm probability.

This application has described procedures, which allow a fast setup of dedicated channels. If the request for DCH setup is initiated by the network, the DCH setup time is essentially just increased by the duration of the DRX interval employed in paging channel state. Being able to setup dedicated channel in this fast way, it will be possible to perform state switching rather frequently, i.e. at a speed of several times per seconds, and provide optimum adaptation to the characteristics of packet data. Frequent data transfer in Cell_FACH state could then be avoided. Even short data packets would be transmitted efficiently on dedicated channels. This makes any further optimizations of data transport in common channel state unnecessary, e.g. concepts like CPCH, tight power control on FACH, etc.

The invention claimed is:

1. A method in a Node B of a telecommunication network for fast setup of a physical communication channel, comprising the steps of:
   managing an assigned share of downlink transmission resources of a radio network controller without inquiry of said radio network controller;
   maintaining a user equipment communication context, wherein said communication context includes an identifier of said user equipment;
   deriving and specifying by help of said user equipment communication context, on reception of a resource request message from a user equipment on a random access channel including at least said identifier of said user equipment, a subset of said assigned share of said downlink transmission resources that can be assigned to said user equipment; and
   assigning over a control channel the specified subset of resources to the user equipment by help of a resource assignment message including the parameters that are necessary for establishing the dedicated channel.

2. The method according to claim 1, wherein said subset of said assigned share of said downlink transmission resources is temporarily assigned until a radio link setup procedure towards the radio network controller has been successfully performed.

3. The method according to claim 1, wherein the downlink transmission resources consist of a share of downlink codes.

4. The method according to claim 1, wherein the downlink transmission resources consist of a share of downlink time slots.

5. The method according to claim 3, wherein the communication context includes pre-agreed information about the user equipment.

6. The method according to claim 3, wherein the resource assignment message includes an identifier of the user equipment.

7. The method according to claim 3, wherein the resource assignment message includes a downlink DPCH channelization code.

* * * * *